350-385 SR ROSS REFERENCE SEARCH ROOM
XR 2,951,895
X 4021 Y X 4025 W WP
X 4048 D X 4009 N
6

Sept. 6, 1960 P. M. G. TOULON 2,951,895

SYSTEMS FOR SEPARATING AND COMBINING MONOCHROME PICTURES

X 2574

Filed June 18, 1954 5 Sheets-Sheet 1

INVENTOR
PIERRE M.G. TOULON

BY Moore & Hall.

ATTORNEYS

2951895
OR IN 358/66

Sept. 6, 1960 P. M. G. TOULON 2,951,895

SYSTEMS FOR SEPARATING AND COMBINING MONOCHROME PICTURES

Filed June 18, 1954 5 Sheets-Sheet 2

INVENTOR
PIERRE M.G. TOULON

BY [signature]

ATTORNEYS

Sept. 6, 1960 P. M. G. TOULON 2,951,895

SYSTEMS FOR SEPARATING AND COMBINING MONOCHROME PICTURES

Filed June 18, 1954 5 Sheets-Sheet 3

INVENTOR
PIERRE M. G. TOULON

BY Mock & Hall

ATTORNEYS

INVENTOR

PIERRE M. G. TOULON

BY [illegible]

ATTORNEYS

INVENTOR
PIERRE M. G. TOULON
BY [signature]
ATTORNEYS 2,951,895

SYSTEMS FOR SEPARATING AND COMBINING MONOCHROME PICTURES

Pierre Marie Gabriel Toulon, Melbourne, Fla., assignor to Moore & Hall, Washington, D.C., a firm comprised of Nelson Moore, William D. Hall, and Elliott L. Pollock Filed June 18, 1954, Ser. No. 437,843

11 Claims. (Cl. 178—5.4)

The present invention relates to a new optical system by which two or more independent monochrome pictures may be combined to produce a color picture in a television receiver. This result can be obtained by using the dispersion system of my copending applications:

Serial No. 149,062, filed May 4, 1950, for: Television System, etc. now abandoned in favor of continuation application Serial No. 555,837, filed December 28, 1955;

Serial No. 163,285, filed May 20, 1950, for: a Television System, now abandoned;

Serial No. 188,557, filed October 5, 1950, for: Color Television, now abandoned;

Serial No. 237,372, filed July 18, 1951, for: Variable Discontinuous Interlaced Scanning System, now abandoned in favor of continuation application Serial No. 663,055, filed June 3, 1957;

Serial No. 266,317, filed January 14, 1952, for: Color Television, now Pat. No. 2,825,754, granted March 2, 1958;

among others, and my U.S. Patents Numbers 2,471,253; 2,541,134; 2,565,103; 2,568,375 and 2,848,536, together with the patents and applications referred to therein.

It is an object of the invention to combine a plurality of monochrome television pictures which are very close together and interlaced with one another into a full color picture.

It is an object of the invention to provide an optical system which combines a plurality of monochrome pictures phase-shifted vertically with respect to each other.

It is an object of the invention to apply a new process to receive a compatible color picture by use of a black and white receiver tube in which the exploring beam is actuated very rapidly with dot interlace scanning of three different displaced vertical locations such that three horizontal lines may be regarded as being scanned simultaneously.

It is an object of the invention to control the intensity of the beam successively in each selected location, i.e. in accordance with the intensity of the selected blue-red dot, the intensity of the selected blue-green dot and in accordance with the intensity of blue, red and green information of the same dot so that three independent monochrome pictures appear on the screen, phase-shifted vertically one above the other.

It is an object of the invention to superpose the three pictures just discussed so that only one colored composite picture appears to the eye of the observer.

It is an object of the invention to provide a new light dispersing or separating device which breaks up a beam of white light into three beams deflected at different angles with respect to each other.

It is an object of the invention to provide special filter means to receive a picture element of white light as a horizontal beam and to split this beam with a component horizontal green beam, a component red beam deflected upward fifteen degrees and a component blue beam deflected downward fifteen degrees.

It is an object of the invention to provide a locally changing screen, such as for example an electrostatically changing color screen referred to in the above copending applications.

According to the present invention the effective or apparent movement of the filter screen is correlated to the scanning of the electron beam of the cathode ray picture tube. If the modulation of the intensity of the beam is controlled in accordance with the signal strength corresponding to "blue," "green" and "red" on three different horizontal picture lines, lines vertically displaced from each other, which are scanned simultaneously by a selected dot interlace pattern, the color screen or filter is affected either by physical movement or electrostatically so that there is exact correspondence between the elemental object being televised and the electron beam at the receiver at any instant.

The invention can also be practiced by using a plurality of electron guns and combining the results thereof. Where a plurality of guns is used to produce a plurality of displaced monochrome pictures the system can be used for stereoscopic pictures in black and white, monochrome or polychrome, depending upon the phosphors employed, the filters used, or both, where both are used together to correct color.

It is an object of the invention to provide a novel light valve construction capable of light modulation and adapted for rapid scanning.

It is an object of the invention to provide a light valve of general application, comprising a pair of polarized laminae with their polarizing axes at ninety degrees with respect to each other and a middle lamina of birefringent material which when stressed by a suitable field rotates the plane of polarization of one of the polarized laminae for the controlled or modulated transmission of light through said light valve.

Reference is made to my U.S. Patents Nos. 2,595,616; 2,720,553, and 2,744,079 for additional background.

In the drawings, like numerals refer to like parts throughout. The forms shown are for illustrative purposes only and are not intended to be limiting.

Figure 5 is a schematic diagram of three-color separation or combination according to the invention.

Figure 1:
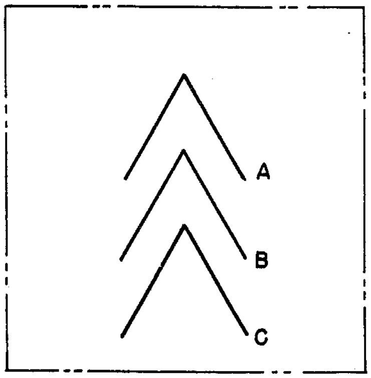
Figure 1 is a schematic showing of a simple subject in three separate pictures superposed by scanning with a shutter.
Figure 1A:
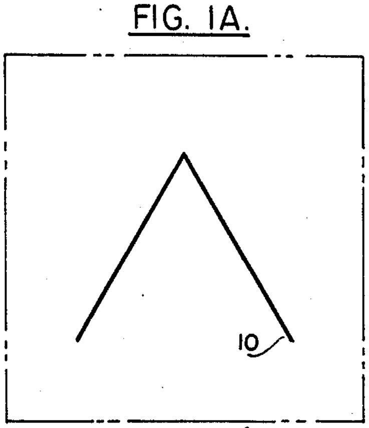
Figure 1A is a composite of pictures of Figure 1.

The picture elements, represented by Figure 1, show three separate pictures A, B and C superposed by scanning with a shutter. According to the invention, A, B and C are only twenty lines or less apart. If a picture of 525 lines is divided into three sections, there would be 175 lines between A, B and C which would require, for example, 3,000 volts for beam deflection and a power consumption of P. Using a displacement of seventeen to twenty lines, the power consumption decreases, according to the square law, to 0.01P.

It is proposed to use the discontinuous dot interlace system of scanning shown in my Patent No. 2,479,880, and in my copending applications Serial Nos. 149,062 and 237,372.

The representation 10 is a composite of A, B and C and may be in full color or black and white and with stereoscopic effect. On the other hand, it may be a single compatible monochrome picture where present-day conventional black and white receivers are used.

Figure 2:
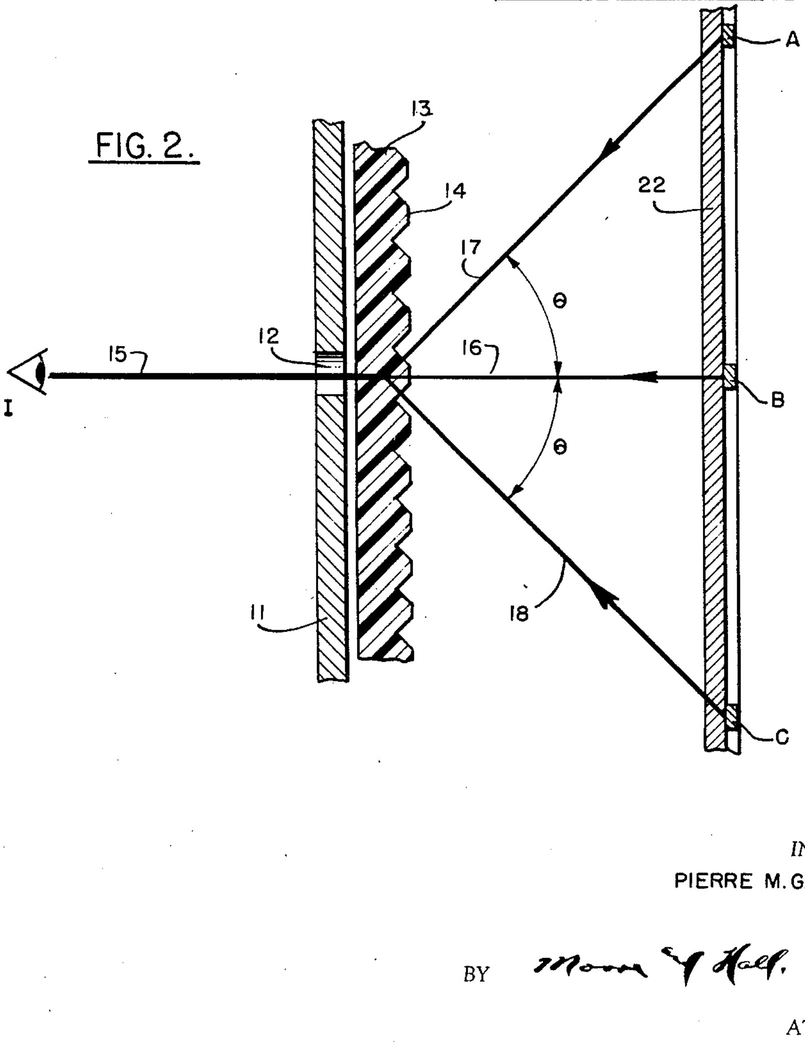
Figure 2 is a fragmentary elevation in section of a moving shutter and special surface according to the invention.

In Figure 2, a shutter 11 having a narrow slit 12 moves upward with a speed S adjacent a special surface 13 with angularly disposed portions 14. The eye of the observer is relatively far removed at I and receives a combined signal light beam 15 made up of a first beam 16 from a central picture element or line B, a second beam 17 from an element or line A, the signal beam 17 making an angle +theta with respect to beam 16 and a third beam 18 from an element or line C, the signal beam 18 making a negative angle theta with respect to beam 16. The angle theta is set at 15° for satisfactory results. Other values may of course be used. It will be appreciated that the elements A, B and C in Figure 2 are each from a separate picture A, B and C respectively of Figure 1. Thus, A may be a monochrome all in red, B all in blue and C all green.

Figure 3:
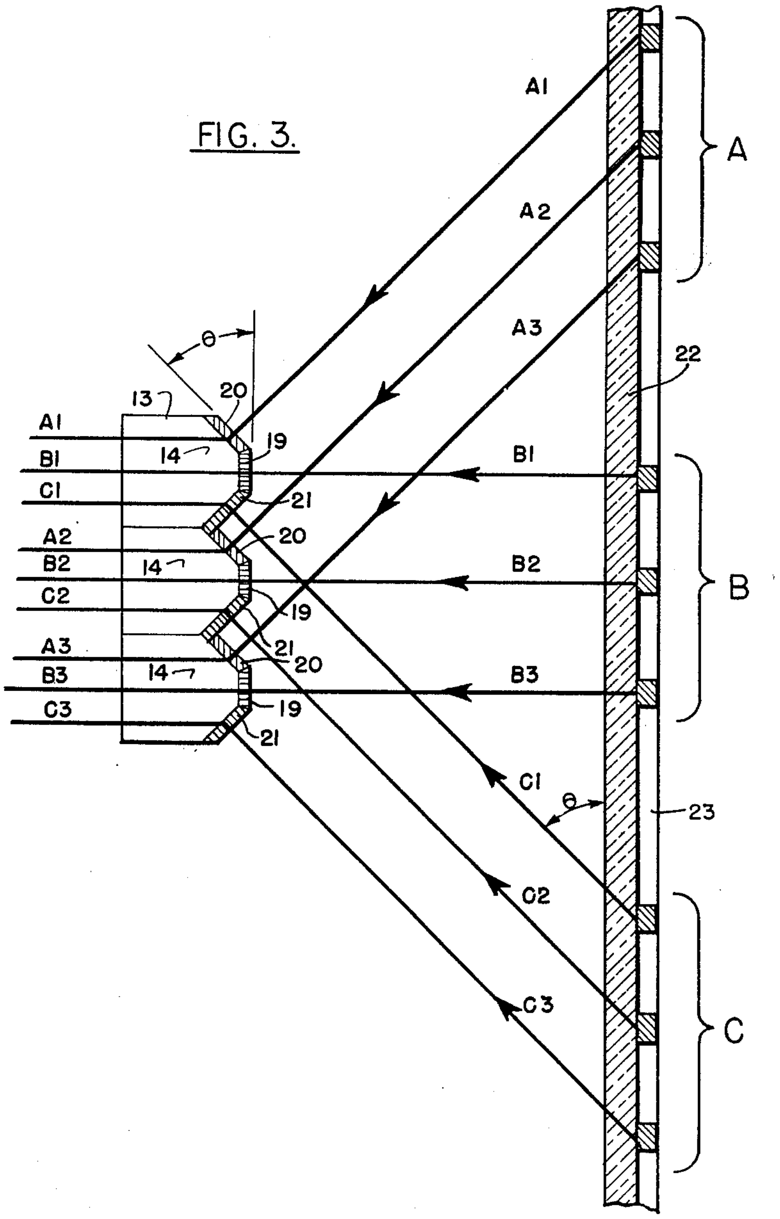
Figure 3 is an enlarged vertical section detail of the special surface of Figure 2.

In Figure 3, the special surface 13 with three elemental portions 14 having angularly disposed surfaces is shown enlarged. The body 13 may be made of glass, transparent plastic or the like. Each section 14 has a front section with three facets or sides. One facet is normal to the optical axis and mounts a blue filter 19. A second facet is inclined upwardly to the rear and mounts a red filter 20 making an angle of theta with respect to filter 19. A third facet is inclined downwardly to the rear and mounts a green filter 21 making an angle of theta with respect to the filter 19. The segment shown in Figure 3 is large enough to illustrate a complete raster with three pictures A, B and C displayed vertically as shown in Figure 1. Although any order will suffice in the normal case, A may be selected to be a monochrome picture representative of red information data. That is, the picture A in Figure 1 may be seen as a black and white picture, but it represents the red values in the picture being televised. As a black and white picture the effect would be somewhat similar to a picture taken with infrared film, the red values being emphasized and the blues suppressed.

A1, A2, and A3 represent parallel beams from a portion of the A picture which pass through red filters 20 and so receive color. That is, A1, A2 and A3 on the right side of Figure 3 have the brightness or value corresponding to the particular red element they represent respectively, but the actual beams are white light. After passing through the filters 20 the beams A1, A2 and A3 are actually red and appear so to the eye, but they will have different levels of brightness because they represent different lines or dots of the picture.

In the same manner filters 19 color the beams B1, B2 and B3 blue and filters 21 color beams C1, C2 and C3 green, but the brightness or value in each case is determined by the amount of white light emitted by the respective phosphor spot concerned. The refracting power and optical characteristics of the material 13 as well as the angle theta are so chosen that the emergent beams A1 through C3 are substantially parallel though displaced. It follows that the "combined" beams 15 are in fact separated, but are sufficiently close together not to appear separated to the eye, so that a blend effect is obtained.

The small hatched blocks labeled A, B and C in Figures 2 and 3, represent dot or line elements of phosphor 23 on coated screen 22.

Figure 4:
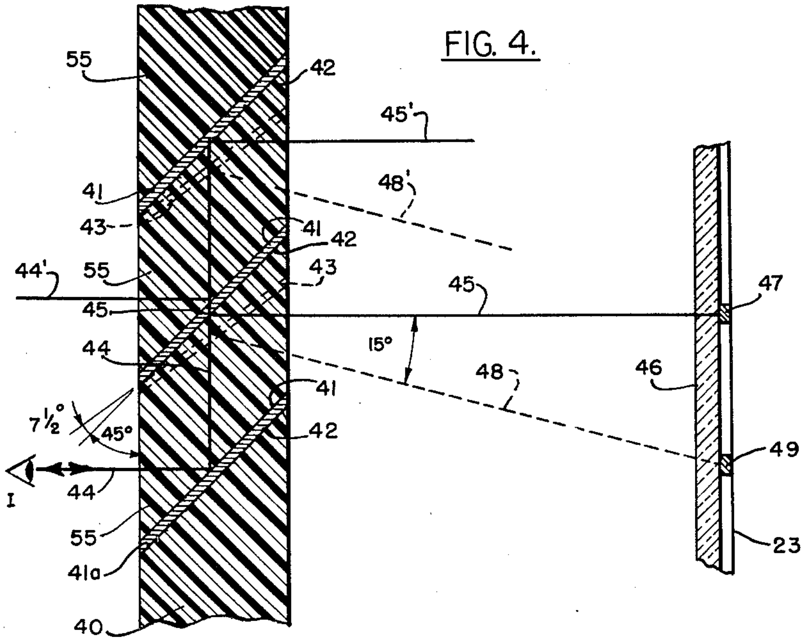
Figure 4 is a schematic diagram of two-color separation or combination according to the invention.

The two-color system of Figure 4 may function either to separate the colors in a beam or to combine two colors to form a beam. In this form the special surface 13 is replaced by a panel of transparent material 40 of a plastic such as methyl methacrylate resin, Lucite, Plexiglas or the like, or it may be made of glass.

The material 40 has mounted therein a total reflecting mirror 41 of silver or other suitable material positioned at 45° to the optical axis of the system. Above the silver mirror 41 is a similar parallel mirror 42 which is likewise totally reflecting and carried within the transparent mounting 40. A support member **41*a* may be used with a metallic deposit forming mirror 41 on its upper side and a metallic deposit forming mirror 42 on its under side. Just below the mirror 42 a red light reflecting dichroic mirror 43 is mounted in material 40 at an angle of 7½° with respect to the mirror 42**.

With this construction it will be seen that a beam 44 of white light entering from the left is entirely reflected by mirror 41 so that the beam 44 continues at right angles within the material 40. On striking the dichroic mirror 43 the blue-green component of beam 44 continues as beam 45 until it strikes totally reflecting mirror 42 where it is reflected at right angles and continues toward phosphor screen 46 parallel to but displaced from the beam 44. Beam 45 makes dot 47 on screen 46 and represents the blue-green component of beam 44. In a receiver this process is reversed as indicated by the arrows.

Red light reflecting in dichroic mirror 43 reflects the beam 48 which is rotated by an angle of 15° from the beam 45 and strikes screen 46 at line or dot 47 which is removed from 47 by seventeen to twenty lines as described in connection with Figure 1. Beam 48 represents the red component of beam 44. It will be understood that the three mirror elements 41–43 provide an alternate form 55 to the units 14 of Figure 3. Accordingly, the upper side of mirror 42 serves as the mirror 41 of the next higher unit and the under side of mirror 41 serves as the mirror 42 for the next lower unit. Better results may be obtained by plating out two mirrors 41 and 42 and mounting them back to back in the material 40 as shown in the upper part of Figure 4.

Figure 4A:
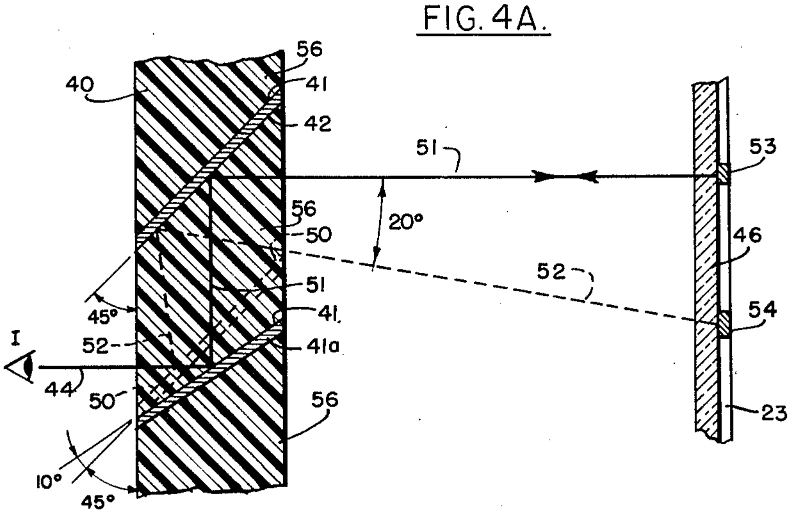
Figure 4A is a schematic diagram of two-color separation or combination according to the invention.

Figure 4A merely shows that the dichroic mirror 43 of Figure 4 can be associated with mirror 41 as well as with 42. Depending upon the optics of the system, the angle of association may be 10° if desired. The dichroic mirror here is numbered 50 because it differs from 43 in that it is selected to reflect green and to transmit blue and red. Accordingly, beam 44 has blue-red beam 51 and green beam 52 as components, making dots 53 and 54 on screen 46, corresponding to screen 22; units 56 correspond to units 14.

In Figures 4 and 4A either beam 45 or 51 may be used for compatible black and white reception of a color telecast with a standard receiver.

It will be understood that the dots 47 and 49, and others like them, are monochromatic or achromatic and differ from each other in brilliance or brightness depending upon the corresponding light level of the chroma selected to reproduce the color of the original dot on the object being televised. The dots 47 and 49 may therefore be termed mono-color meaning they may both be the same color, usually gray, but will differ from time to time in brilliance or brightness.

Figure 5 shows a three-color system in effect combining Figures 4 and 4A by using two dichroic mirrors, one reflecting red and the other reflecting green in the same unit 60. The mirrors 41 and 42 are the same as in Figures 4 and 4A. However, for some applications, it may be desirable to space them a little differently for three-color work. A dichroic mirror 61 which is green reflecting and blue-red transmitting is mounted in material 40 as shown at an angle of 10° with respect to silvered mirror 41, that is, the dichroic mirror 61 makes an angle of 55° with the left face of the unit 60. A second dichroic mirror 62 is mounted in material 40 at an angle of 10° to the silver mirror 42. Dichroic mirror 62 is red reflecting and blue-green transmitting. If a beam of light 63 of a given composition is projected into unit 60 it first strikes dichroic mirror 61 which reflects the green component as beam 64 and permits the blue-red to pass as beam 65 which is totally reflected 90° by mirror 41 so as to travel within the material 40 parallel to its left and right faces as shown. The beam 65 next encounters dichroic mirror 62 which reflects the red component as beam 66 and permits the blue component to pass as beam 67 and be reflected by silver mirror 42. Meanwhile, the green beam has passed through dichroic mirror 62 and has been reflected by mirror 42.

It will be noted that the beams 64, 67 and 66 impinge on elemental dot portions 68, 69 and 70, respectively, of screen 46 which are separated by about twenty lines. Blue beam 67 is parallel to, but displaced from, beam 63. Green beam 64 makes an angle of 20° with beam 67 and red beam makes the same angle in the opposite direction. With this arrangement it will be clear that beams 64, 67 and 66 can be combined into a composite beam 63 at I, or a beam 63 from an object being televised can be broken up into three-color component beams 64, 67 and 66 as shown. This portion of the system as shown in Figures 2 through 5 is reversible, as is the entire system.

Figure 6:
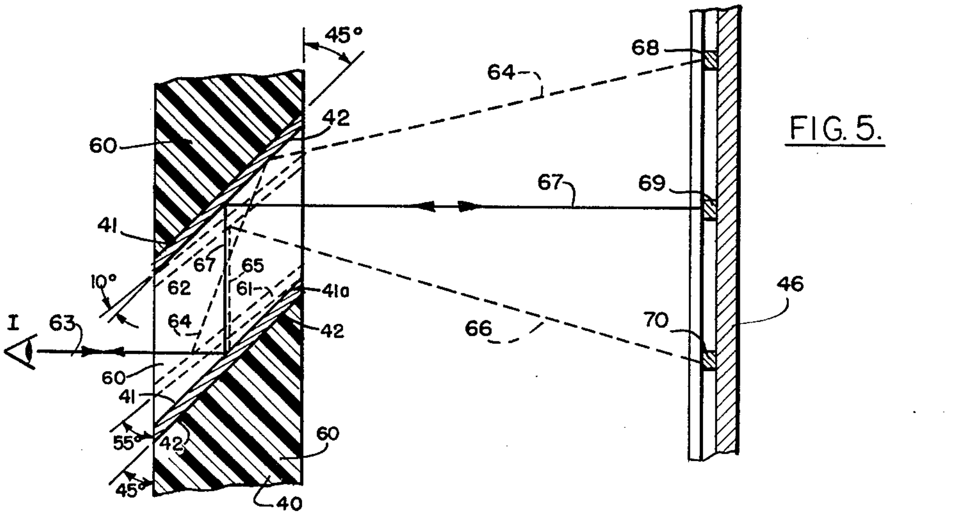
Figure 6 is a schematic diagram in fragmentary elevation of a portion of one form of the system.

Figure 6 shows an improved form of electrical shutter which does not require physical movement such as that of shutter 11 with its slot 12 shown in Figure 2. A plate assembly comprises two outer polarized laminae 71 and 72 with their polarizing axes rotated 90° with respect to each other. A lamina 73 of electrolytic condenser material is grounded at 74. The lamina or layer 73 may be made of an acidified mixture of gelatine and glycerine to which glycol may be added. Sulfuric and nitric acid are used to produce ionization. The central layer 75 is composed of liquid nitro-benzine or ammonium phosphate crystals which can be employed without serious or harmful discontinuity. These materials are birefringent in character and change their light transmitting characteristics when stressed by an electrostatic field.

Figure 7:
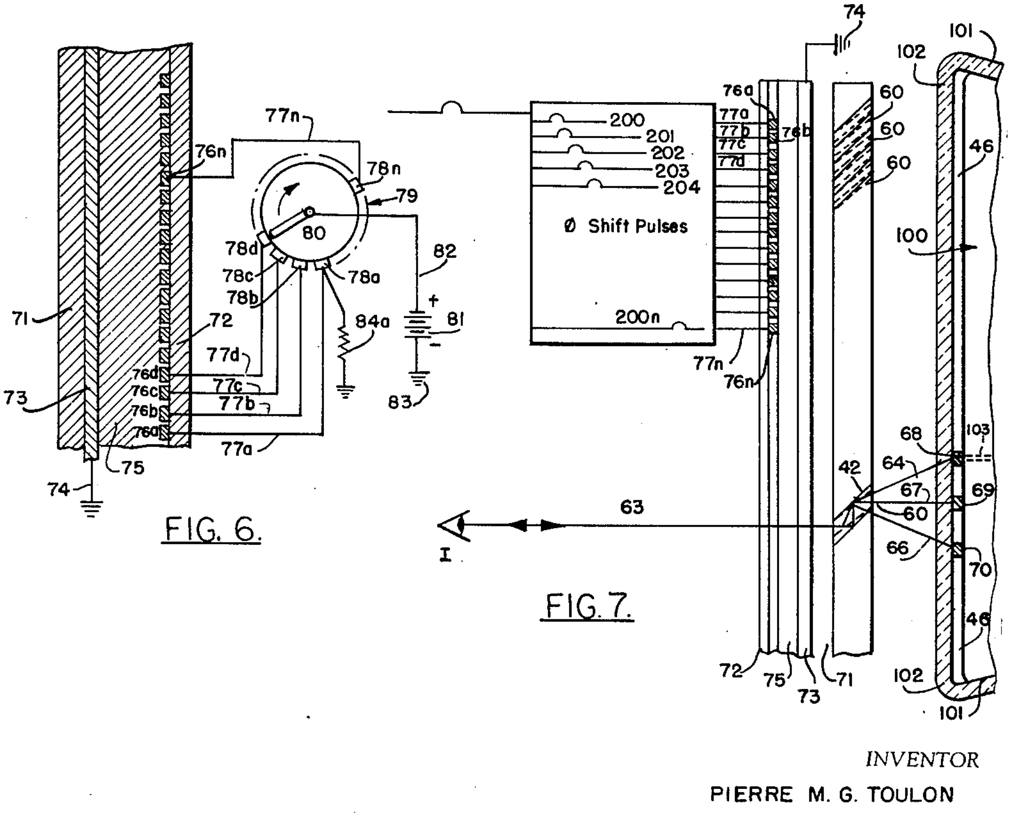
Figure 7 is an elevation of a schematic diagram of an apparatus set up according to the invention.

Along the side of central layer 75 opposite to layer 73 is positioned a number of elongate strips 76 of material of the same nature as the layer 73. It is desirable to have the strips 76 correspond to the units 60 as indicated in Fig. 7 and drawn to enlarged detail in the left-hand portion of Fig. 5 where they are indicated as a whole at 60. Each of the strips ***76a*, *76b*, *76c*, etc. is connected by a corresponding wire *77a*, etc. to a corresponding segment *78a*, etc. on commutator 79, the arm 80 of which rotates at sixty r.p.s. Arm 80 closes contact with each segment *78a*, *78b*, *78c*, *78d*, etc. in turn and is connected to the positive side of 500-volt battery 81 by wire 82. Battery 81 is grounded at 83 and each commutator segment *78a*, *78b*, *78c*, *78d*, etc. is individually grounded through a resistor *84a*, *b*, *c***, etc. of a megohm.

As armature 80 rotates an E.M.F. of 500 volts is placed between strip *76a* and lamina 73 and the resultant stress on the birefringent material 75 rotates the plane of polarization of light transmitted by polarizing filter 72 so that the plane corresponds with the plane of polarization of layer 71 and is transmitted therethrough. As arm 80 rotates the voltage is transferred to successive strips ***76b*, *76c*, etc. and the field stressing the material 75 moves upward with the same effect as the moving slit 12 in Figure 2. As the arm 80 rotates to segment *76b* the charge on segment *76a* leaks off to ground through resistor *84a*, etc. Where a sharp pulse at segments *76a*, etc. is undesirable armature 80 may be provided with a transverse elongated resistor tip of carbon, nickel or tungsten wire, or the like and bridge two or three segments. However, it is usually desirable to confine the slit effect to a single unit 60 and by means of a single charged segment *76n***.

When a potential difference exists across the material 75 between the ionized material of layer 73 and the strips of the same material ***76a* . . . *76n*, the stress of the potential causes birefringence in the material 75 and a resultant rotation in the plane of polarization of the light which has passed through either lamina 72 or lamina 73 by an amount which permits its passage by the other lamina. That is laminae 72 and 73 are both polarized with axes of polarization at 90° with respect to each other and each opaque to light polarized by the other. When, however, the potential across a segment *76n* and plate or laminae 73 stresses birefringent material 75, it rotates the polarized beam until its plane of polarization is as nearly parallel to the plane of polarization of the second laminae 72 or 73 as can be arranged, thus making a light valve which will move up the material 75 as the potential moves from segment *76a* to *76n***.

Commutator 79 may be replaced by an electronic pulsing circuit such as that shown in my copending applications Serial No. 149,062 and U.S. Patent No. 2,479,880.

It will be understood that where liquids or materials subject to flow are used such as nitro-benzene in layer 75 or the like, they are to be suitably inclosed in an envelope or other container which may be of glass or any suitable transparent material.

Figure 7 is a schematic showing of an assembly of the various elements described above working together. A cathode ray tube 100 is provided with a black and white phosphor coating 46 and aquadag 101 on the inner surface of envelope 102. For purposes of illustration, elemental dot or line areas A, B and C are selected at about twenty lines apart and scanned by electron beam 103.

The brightness of elemental area A, as produced by the bombardment thereof by modulated electron beam 103 at the instant under consideration, is determined by the brightness or value of the green component of the color of the corresponding area of the object being televised. In the same way the beam 103 causes the area B to glow with a brightness corresponding to the brightness of the blue component of the color of the corresponding area of the object and the area C to glow with a brightness corresponding to the brightness of the red component of the color of the corresponding area of the object. It should be emphasized that A, B and C are different elemental areas some twenty lines apart and that all three are in "black and white."

In general, the color filters employed are red, green and blue in hue and as highly saturated as optimum operation permits. Thus, saturation of a reproduced color, as viewed by the observer, may be regarded as a function of brilliance, beginning at zero for black, passing through a maximum at median gray and decreasing again to produce the pastel tints as white is approached. It is not to be inferred that if the blue and green components were eliminated entirely that an increase in the amount of light through a red filter, such as here disclosed, would yield pink. Pink is produced by the desaturation of the light from the red filter by the addition of some blue and green light which may be thought of as combining with some of the red to produce a small portion of white light with red predominating. As the proportion of white light thus synthesized increases, the resultant pink becomes paler and paler until pure white light is produced when the amount of light passed by each of the three filters is equal.

As all tints, including the so-called pastel shades, are produced by the addition of white light in some degree, to a saturated color or hue, there will always be some signal or light passed by all three color filters as saturation of the color of hue of the televised object decreases. Colors other than red, green or blue are produced at maximum saturation by the minimization or suppression of one of the three signals or light components. Thus, assuming saturated filters, the combination of light through any two will produce a saturated color of intermediate hue depending upon the relative amounts of light passed by the two filters. Theoretically no white light component is produced. However, in practice the filters themselves are not fully saturated and there is always some white light unless the color of the object itself is saturated and only saturated light enters the filter.

To what degree true hue and saturation of the colors in the chromatic scale of the object being televised are sacrificed by selected characteristics of the filters 19, 20 and 21 or the dichroic mirrors 43, 50, 61 and 62, is not fully known, but it seems likely that the principal factor supplied by the fluorescent elemental areas A, B and C are the brilliances of the particular color of the respective areas, and a reasonable compromise is acceptable with regard to hue and saturation. It may therefore be of some importance to insure that the fluorescent light produced by phosphor 46 is reasonably "white" so that the hue and saturation of the colors produced by filters 19, 20 and 21 or by dichroic mirrors 43, 50, 61 and 62 are sufficiently median to give a satisfactory approximation. It follows that when the beam 103 is directed to elemental area A that it is modulated to correspond with the brilliance of the green color component only of the corresponding object area. That is, if the object area corresponding to the elemental area A is a brilliant red of medium saturation then the beam 103, if directed at the elemental area A68 at that instant, should be modulated to a low value, perhaps close to cut off, and the area A68 may fluoresce only slightly. The same is true of element B69, but element C70 will be bright with a brilliance corresponding to the red of the object at the point being scanned and beam 103 will be much stronger than before, causing elemental area C70 to fluoresce actively. Although areas A68, B69 and C70 are about twenty lines apart on screen 46, they represent the same or substantially the same elemental area on the object being televised and the three components comprise the color of the selected area of the object.

The beam 64 representing green, beam 67 representing the blue and the beam 66 representing the red component values, are combined by mirror segments 41, 42, 61 and 62 into the beam 63 which is seen by the eye at I. The moving shutter effect is the same as that described in Figure 6 and may be achieved by a plurality of phase shift pulses 200 to 200$n$ as shown in my Patents Nos. 2,565,103, 2,568,375 and 2,471,253.

Where the arrangement of Figure 7, with its property of reversibility, is employed to televise an object at I, a suitable lens system is provided to focus an image of the object on plate 72 which is scanned by means of the shutter effect described. The focussed beam 63 is broken up into its three color component beams 64, 67 and 66 which may thereafter be handled in the classical manner with equipment known to the art of televising.

Figure 8:
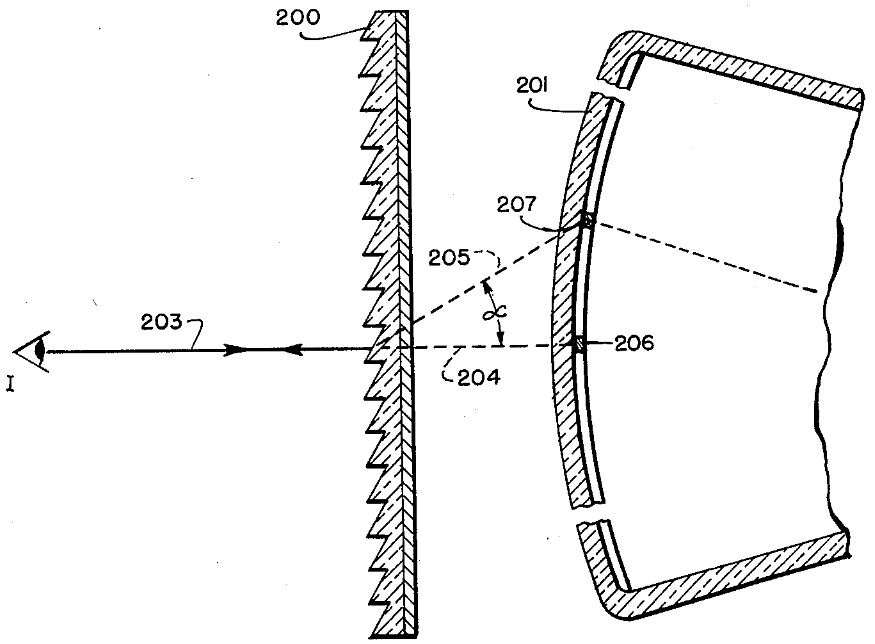
Figure 8 is a fragmentary vertical section of one form of this invention using a Fresnel lens.

In Figure 8, a Fresnel type lens or plate 200 of birefringent material such as Iceland spar, for example, is mounted in front of the fluorescent surface 201 of a cathode ray tube 202. The character of material 200 is such that it breaks up an incident beam of light 203 into two component beams one of which, 204, continues along the same line and the other of which, 205, is polarized with respect to beam 204 and diverges therefrom by an angle alpha. Plate 200 and tube surface 201 are spaced apart a distance such that beam 204 strikes the surface 201 at a line or spot 206 which may correspond to the right eye of an observer and beam 205 strikes at spot 207 about twenty lines away which may correspond to the left eye. The plate 200 is used in conjunction with vertical and horizontal polarized glass similar to that of polarized laminae 71 and 72 of Figure 6.

With this construction three-dimensioned or stereoscopic effects are attainable.

While there has been described above what are at present believed to be the preferred forms of this invention, it will be understood by those skilled in the art, that the spirit thereof may be embodied in still other forms and all such are intended to be covered in generic terms by the claims of varying breadth attached hereto.

I claim:

1. A color television system comprising a tube having a fixed direct view picture screen, means comprising a single electron gun and fixed light deflecting means for presenting simultaneously on said screen a plurality of spaced mono-color dots representing respectively the brilliances of different chromas of the same dot on an object the image of which is presented on said picture screen and light transmitting means positioned between said screen and the preferred region of observation thereof constructed and arranged to provide the proper chroma for light from each mono-color dot whereby the respective brilliances and chroma of the said plurality of dots are combined to produce a single dot corresponding in hue, saturation and brilliance to said corresponding object dot and means to scan said light transmitting means, said light transmitting means being substantially coextensive with the picture producing area of said picture screen, said light transmitting screen having a plurality of dichloric optical elements therein constructed to impart selected hues to light from said plurality of spaced mono-colored dots, the geometrical arrangement of said elements being such that light rays from said plurality of spaced dots are combined substantially into a single beam, said shutter means being electrical and comprising outer polarized laminae having their axes of polarization normal to each other, an inner lamina of electrolytic condenser material made up of elongate strips of material of substantially line width and means to apply a potential to said strips in sequence whereby the axis of polarization of portions of one of said polarized laminae corresponding to each of said strips is rotated and light transmitted by each said portion in sequence whereby light may be received from substantially the entire surface of said screen as said strips are energized in rapid succession.

2. The combination set forth in claim 1, said means to apply a potential comprising a commutator means having individual connections to each said strip, said shutter means being constructed to provide a narrow elongate moving light transmitting channel the length of which extends across the screen and the width of which corresponds substantially to the width of a picture line on said screen.

3. In combination in scanning means for a television system a laminated structure comprising two outer polarized laminae with their polarizing axes rotated ninety degrees with respect to each other, a lamina of electrolytic condenser material between said two outer layers, a central layer comprising material birefringent in character and which changes its light transmitting characteristics when stressed by an electro-static field, said birefringent material layer being so positioned with respect to one of said polarized laminae that the application of an electrostatic field rotates the plane of polarization of light transmitted by said one of said laminae, and means to apply an electro-static field progressively along said birefringent material.

4. The combination set forth in claim 3, said means to apply an electro-static field comprising a plurality of long narrow conductor strips.

5. The combination set forth in claim 4, said means to apply an electro-static field comprising a source of phase shifted voltage pulses and means to supply said pulses sequentially to said long strips said birefringent material, said plurality of long narrow conductor strips and said means to supply an electro-static field comprising electro-static shutter means constructed to provide a narrow elongate moving light transmitting channel the effective length of which extends across the screen and the width of which corresponds substantially to the width of a picture line on said screen.

6. The combination set forth in claim 5, said last-named means comprising a computator having segments corresponding in number to the number of said long strips and connected thereto sequentially.

7. In combination in an electrical shutter, a plate member comprising two polarized laminae having their polarizing axes rotated substantially 90° with respect to each other, a lamina of electrolytic condenser material and another lamina of birefringent material in plane rotating relation to one of said polarized laminae, said birefringent material having the property of rotating the plane of polarization of light impinging thereon through one of said polarized laminae when the material is stressed by an electrical field and electric field producing means to apply an electric field to stress said birefringent material.

8. The combination set forth in claim 7, said electric field producing means comprising means to apply a narrow strip of effective field across one dimension of said plate member and move said field rapidly to cover a desired area of said plate.

9. The combination set forth in claim 8, said field producing means comprising means to move said effective field in a direction transverse to the length of said narrow field strip.

10. The combination set forth in claim 9, said birefringent lamina having the property that its light transmitting characteristics change when the birefringent material is stressed by an electrical field, said field producing means comprising elongate strips of electrolytic condenser material of a width to produce said effective field strip, placed in side-by-side relation across said plate, said field producing means comprising electrical pulse distribution means connected to apply a voltage pulse to said condenser strips in rapid succession and cause the narrow strip of effective electric field to sweep across the surface of said plate as a moving slit light shutter.

11. The combination set forth in claim 10, said field producing means comprising a voltage source and a rotating commutator having commutator segments connected to said elongate strips of condenser material in sequence so that a voltage pulse is applied to each said elongate strip in rapid sequence, said electrolytic condenser material comprising an acidulated mixture of gelatin and glycerine, said birefringent lamina being positioned contiguous to one of said polarized laminae and comprising one of a class containing ammonium phosphate and nitrobenzine, said polarized laminae being outer laminae.

References Cited in the file of this patent

UNITED STATES PATENTS

| | | |
|---|---|---|
| 2,290,651 | Peck | July 21, 1942 |
| 2,481,621 | Rosenthal | Sept. 13, 1949 |
| 2,598,941 | Roth | June 3, 1952 |
| 2,615,975 | Sziklai | Oct. 28, 1952 |
| 2,773,118 | Moore | Dec. 4, 1956 |
| 2,797,256 | Millspaugh | June 25, 1957 |